Figure 1:
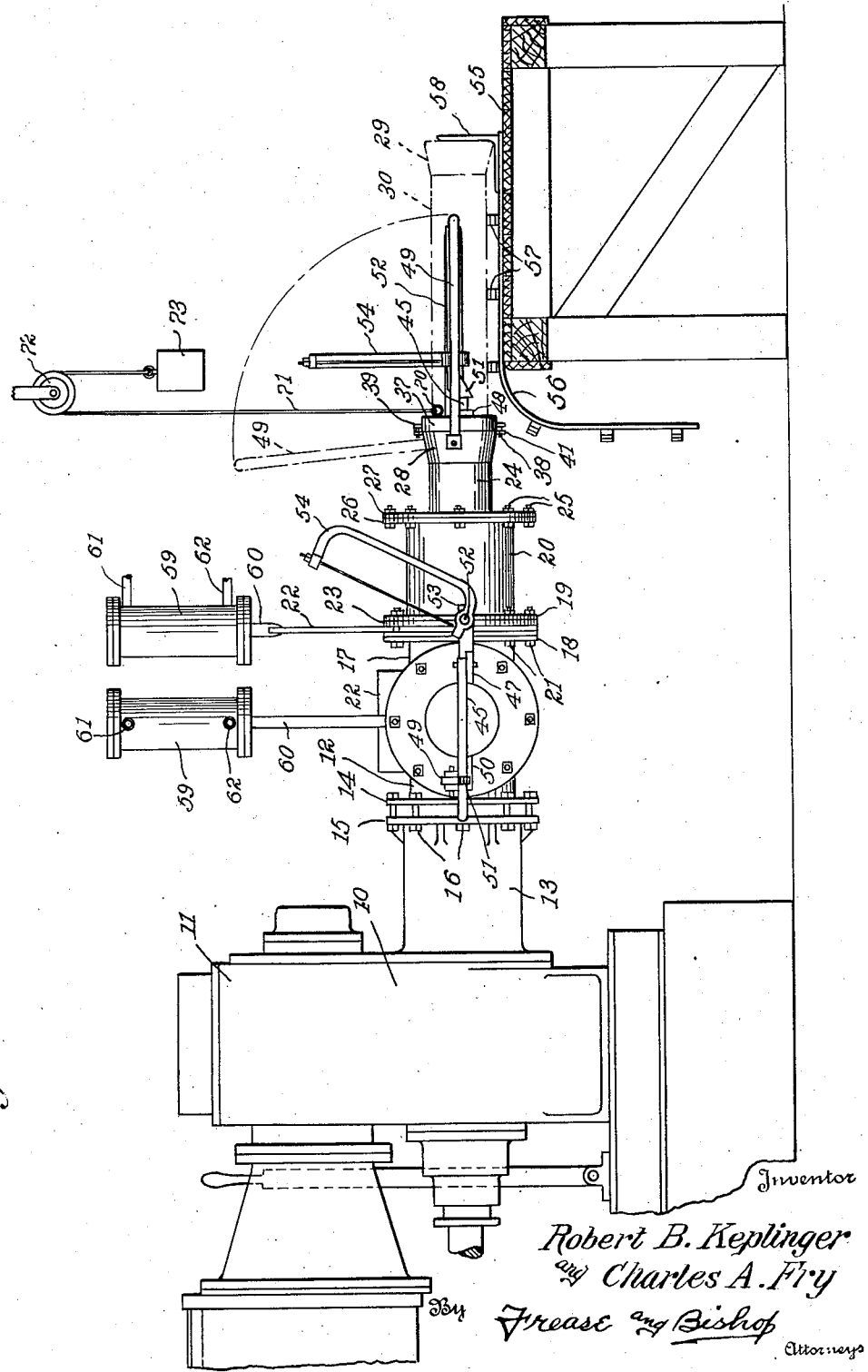

Dec. 25, 1945.   R. B. KEPLINGER ET AL   2,391,424
MACHINE FOR MOLDING TUYERES
Filed Nov. 19, 1943   4 Sheets-Sheet 1

Inventor
Robert B. Keplinger
and Charles A. Fry
By Frease and Bishop
Attorneys

Dec. 25, 1945.  R. B. KEPLINGER ET AL  2,391,424
MACHINE FOR MOLDING TUYERES
Filed Nov. 19, 1943  4 Sheets-Sheet 2

Inventor
Robert B. Keplinger
Charles A. Fry
By Frease and Bishop
Attorney

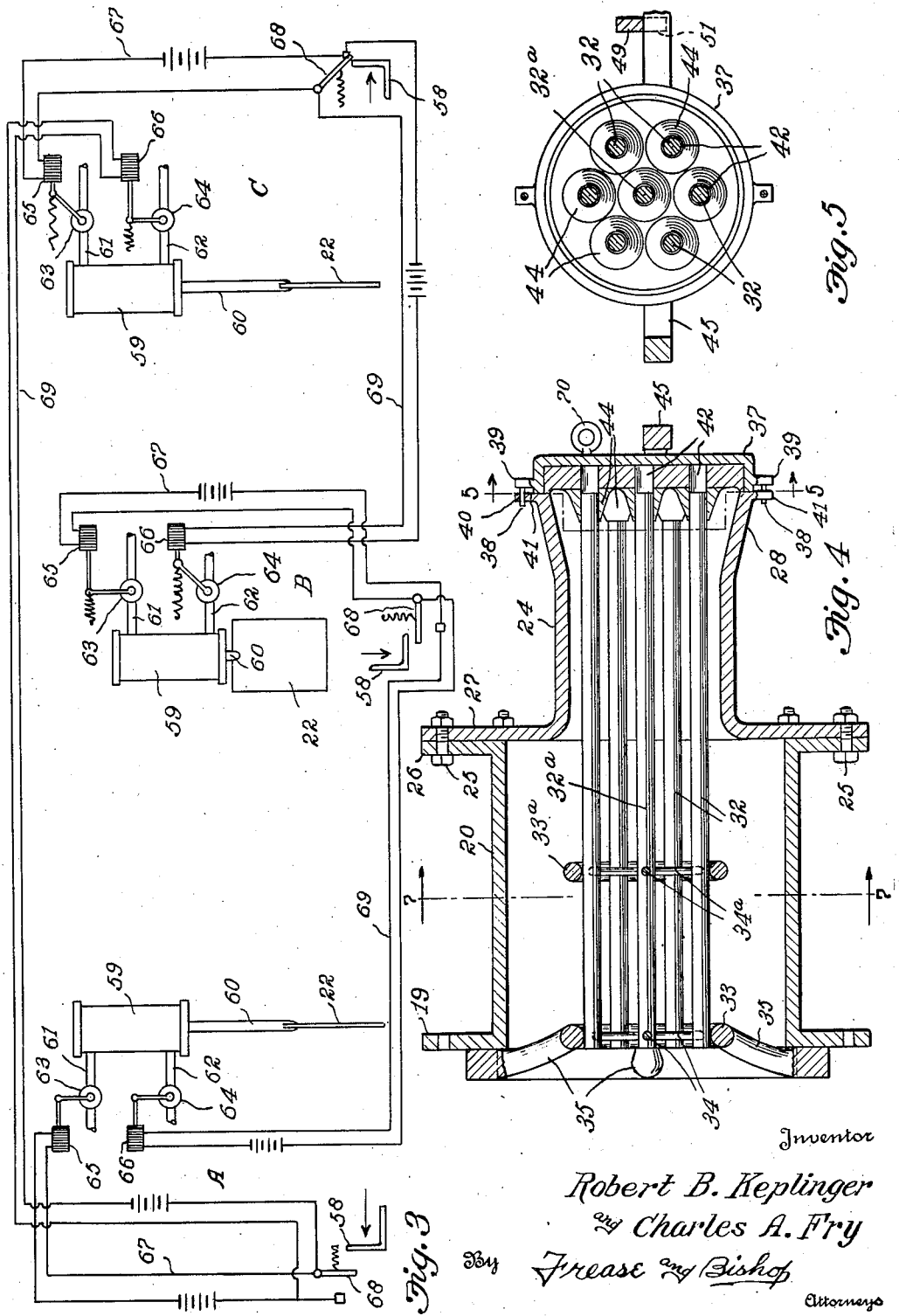

Dec. 25, 1945. R. B. KEPLINGER ET AL 2,391,424
MACHINE FOR MOLDING TUYERES
Filed Nov. 19, 1943 4 Sheets-Sheet 4
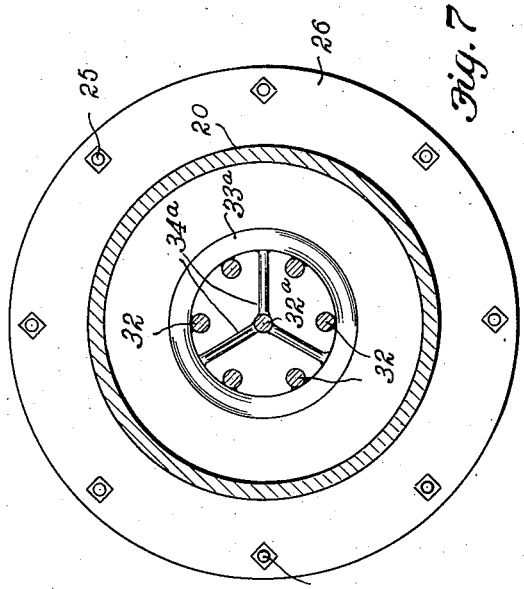
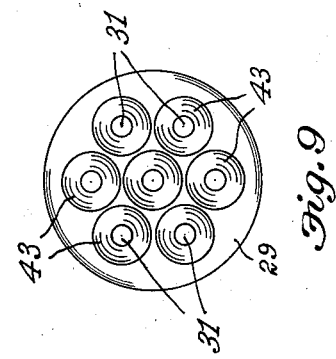
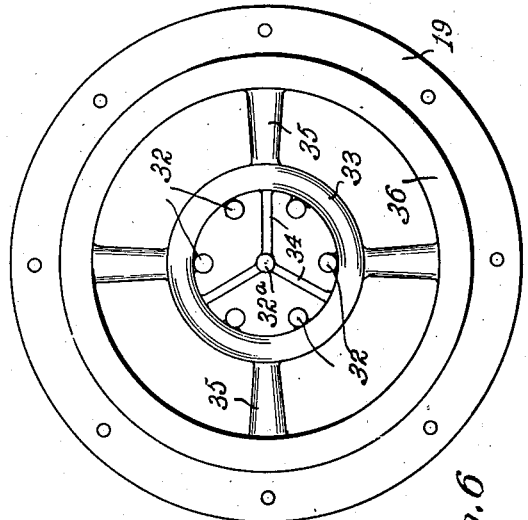
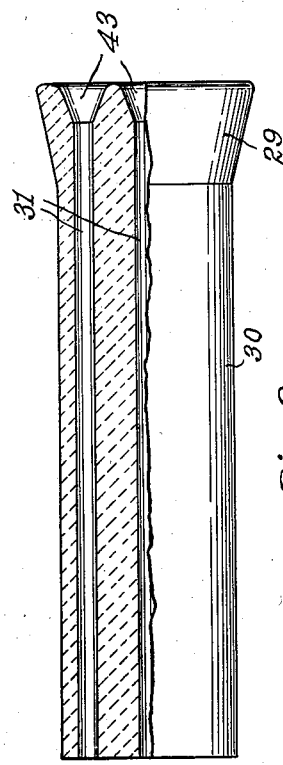
Inventor
Robert B. Keplinger
and Charles A. Fry.
By Frease and Bishop
Attorneys Patented Dec. 25, 1945

2,391,424

UNITED STATES PATENT OFFICE 2,391,424

MACHINE FOR MOLDING TUYÈRES

Robert B. Keplinger, Canton, and Charles A. Fry, Minerva, Ohio

Application November 19, 1943, Serial No. 510,936

5 Claims. (Cl. 25—33)

The invention relates to improved methods and apparatus for producing ceramic tuyères for use in Bessemer converters.

These tuyères are long, refractory clay cylinders with a bell at one end and pierced with a plurality of longitudinal holes to permit air under pressure from the wind box to flow into the bottom of the molten charge of pig iron in the Bessember converter for oxidizing the charge.

Due to the serious scrap shortage caused by the greatly increased steel production during the present emergency, Bessemer steel is in great demand and many new Bessemer converters have been and are being placed in use.

Until quite recently these tuyères have been produced in only small quantities and it has been present practice to make them on a sewer pipe press, or by hand ramming. This is not only a slow and tedious method of manufacture, but the clay body does not have the proper, or uniform density, causing considerable warpage during burning and frequently causing the tuyères to fail sooner than they should.

The object of the present invention is to provide a method and apparatus for the manufacture of tuyères which overcomes the above mentioned difficulties in manufacture and use and which produces a tuyère having greater density and strength and increased resistance to slag and metal erosion.

Another object is to provide for making an extruded tuyère formed of deaired clay having a uniform density, and being substantially free of laminations.

Still another object is the production of a tuyère by means of a specially designed extrusion die having longitudinal core rods therein for forming longitudinal holes through the tuyère.

A further oject is the provision of a pressure gate upon the die having means for receiving and properly positioning the outer ends of the longitudinal core rods.

A still further object is to provide means upon the pressure gate for countersinking the outer ends of the longitudinal holes in the tuyère.

Another object is the provision of means for forming a pressed and extruded tuyère from a grained and deaired clay body having low porosity and high mechanical strength.

Still another object is the formation of a tuyère from a clay body consisting of 50% to 70% flint clay, 10% to 20% high temperature grog, and the balance plastic fire clay.

A further object is the provision of an off-bearing conveyor for supporting the flared, green clay column against lateral and downward deflection as it is extruded from the die.

A still further object is the provision of a multiple headed auger machine for successively extruding a plurality of tuyères.

A further object is the provision of means for automatically stopping the column as it is extruded to the proper length from one of the multiple dies and simultaneously starting the column through another of the dies.

A still further object is to provide a method of intermittent operation of a horizontal auger extrusion machine by first forcing the clay into a confined die under pressure to fill out a flared shape and obtain a greater density of the deaired clay body, followed by extrusion without pressure to produce the desired length of tuyère.

The above objects, together with others which will be apparent to those skilled in the art, or which may be later referred to, may be attained in the manner hereinafter described in detail by the use of apparatus such as illustrated in the accompanying drawings, in which—

Figure 2:
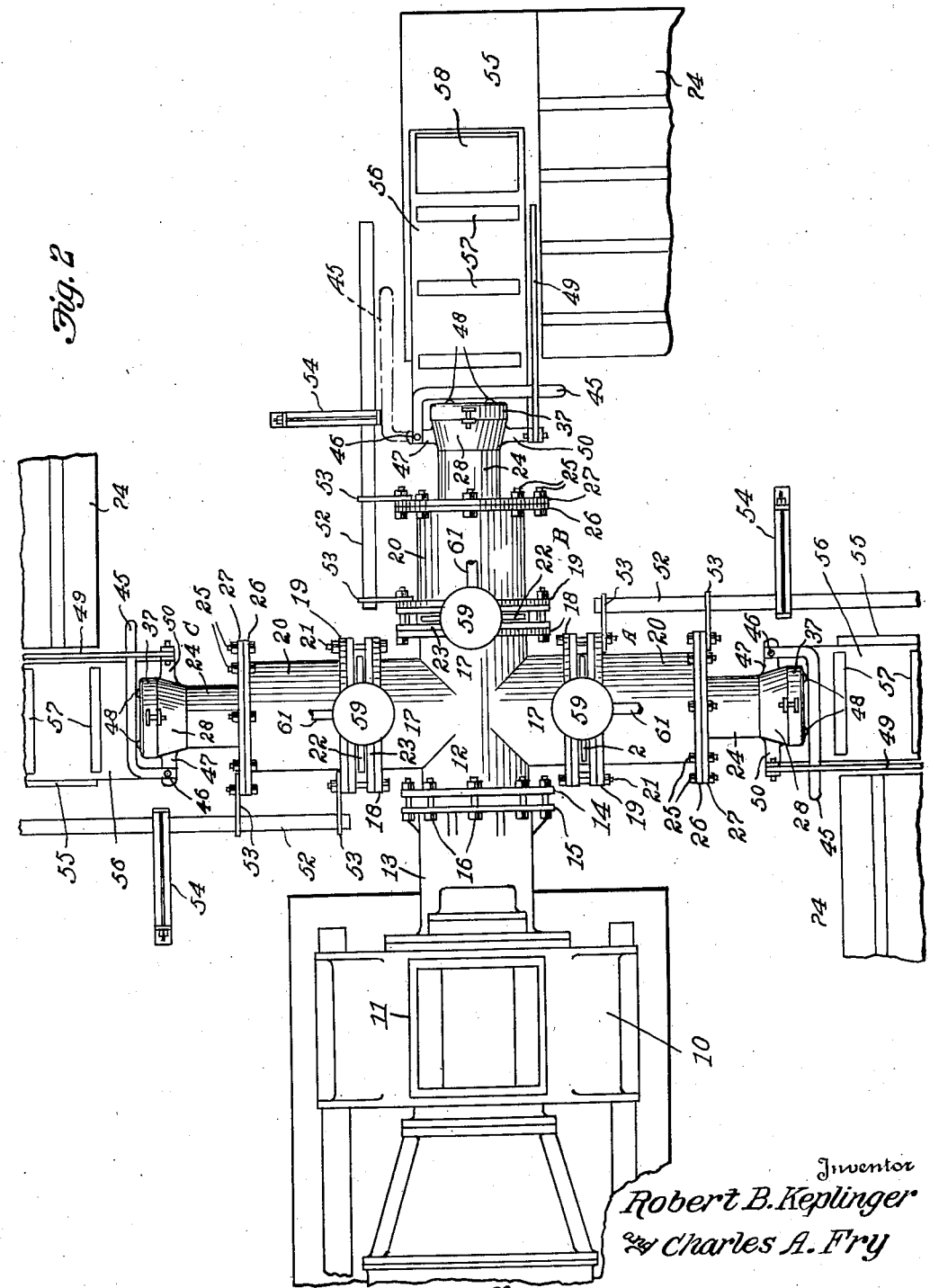

Figure 1 is an elevation of a horizontal auger extrusion machine constructed in accordance with the invention;

Fig. 2, a top plan view of the machine illustrated in Fig. 1;

Fig. 3, a diagrammatic view of automatic means for shutting off the flow of clay through one of the multiple dies when the column has reached the desired length, and simultaneously starting the flow of clay through another of the dies.

Fig. 4, an enlarged, longitudinal section through one of the improved extrusion dies and the extension barrel on which it is mounted showing the pressure gate in closed position thereon;

Fig. 5, a transverse section on the line 5—5, Fig. 4, showing the inner face of the pressure gate;

Fig. 6, a rear elevation of the extension barrel showing the manner of mounting the longitudinal core rods therein;

Fig. 7, a transverse section through the extension barrel, taken on the line 7—7, Fig. 4;

Fig. 8, a longitudinal, sectional elevation of one of the tuyères; and

Fig. 9, an end view of the flared or flanged end of the tuyère.

Similar numerals refer to similar parts throughout the drawings.

An auger extrusion machine of conventional design is indicated generally at 10, and is shown provided with a deairing chamber 11 for deairing the clay as it is passed through the machine. In order to speed up production the machine may be provided with a plurality of dies through which the clay is successively extruded so that continuous operation of the machine may be maintained.

For this purpose a multiple barrel 12 is attached to the extruding auger barrel 13 of the machine. The multiple barrel and auger barrel may be provided with the opposed flanges 14 and 15 respectively, receiving the bolts 16 for connecting the parts together.

The multiple barrel 12 is shown provided with three outlet necks located at right angles to each other, means being provided for attaching an extrusion die to each outlet neck as will be later described. The number and arrangement of these outlet necks may be varied, and if only a single extrusion die is desired this may be connected to the auger barrel and the multiple barrel may be eliminated.

Each outlet neck of the multiple barrel may terminate in an annular flange 18 which is connected to a similar flange 19 upon an extension barrel 20 by means of bolts 21.

For the purpose of shutting off the flow of clay through each extension barrel when desired, a cutoff plate 22 may be located between each outlet neck 17 of the multiple barrel and the adjoining extension barrel 20, this plate being preferably slidably mounted in a box 23 interposed between the flanges 18 and 19 and secured by means of the bolts 21.

A cylindric extrusion die 24 is attached to the outer end of each extension barrel as by the bolts 25 located through the abutting flanges 26 and 27 upon the opposed ends of the extension barrel and die respectively.

The outer end of each die 24 is flared as at 28 in order to form the flared head 29 upon the tuyère 30, shown in Figs. 8 and 9. For the purpose of forming the longitudinal holes 31 in the tuyère the core rods 32 are mounted within the die.

Referring to Figs. 4 to 7 inclusive, these core rods are shown supported at their rear ends by a ring 33 to which the ends of the outer core rods are welded or otherwise attached, while the central core rod 32a is supported by the radial spokes 34 extending inward from the ring 33.

The ring 33 may be centrally supported within the rear portion of the extension barrel 20 by the radial arms 35 extending inwardly from the annulus 36 arranged to be clamped between the flange 19 of the extension barrel and the opposed flange 18 of the multiple barrel.

Intermediate their ends the core rods are supported by a ring 33a, to which the outer rods 32 are connected, as by welding, the central rod 32a being supported by the radial spokes 34a extending inward from the ring 33a.

A removable gate 37 is provided at the outer or flared end of each die 24 and for properly positioning the gate upon the die, pins 38, carried upon peripheral ears 39, on the gate, are adapted to be received through apertures 40 in the ears 41 at the end of the die.

The gate 37 is provided with sockets 42 to receive the outer ends of the core rods and in order to form the countersunk or flared outer ends 43 in the longitudinal holes 31 of the tuyère, conical bosses 44 are formed on the inner side of the gate surrounding said sockets.

The gate 37 is adapted to be held in closed position upon the die by means of the angular locking bar 45, pivoted as at 46 upon a lug 47 on one side of the die and adapted to be closed against the bosses 48 on the outer side of the gate and held in this position by the latch bar 49 pivoted upon the lug 50 on the other side of the die and provided with the locking shoulder 51 for engaging over the locking bar 45 to hold the same in locked position.

A rod 52, supported upon ears 53 on one side of the extension barrel, slidably and rotatably supports a cutoff knife 54 of usual and ordinary construction for cutting off the extruded clay column in the proper length to form a tuyère.

An off-bearing table 55 is located beyond each die, and for the purpose of supporting the extruded column against lateral and downward deflection an off-bearing conveyor is provided in the form of a belt 56 having spaced transverse cleats 57 of sufficient height to support the column so that the flared head 29 will rest upon the transverse angle iron 58 at the forward end of the conveyor.

In order that the machine equipped with a plurality of dies as illustrated in the drawings, may be continuously operated, means may be provided for automatically operating the cutoff plates 22 of the several dies so that as a tuyère is formed and extruded to the desired length from one die the cutoff plate for said die may be automatically closed and the cutoff plate from another of the dies simultaneously opened.

For this purpose each of the cutoff plates 22 may be operated by a steam or other fluid cylinder indicated at 59, the cutoff plate 22 being carried by the plunger or piston rod 60 of said cylinder. Fluid under pressure may be admitted to the upper end of each cylinder, through a pipe 61, for lowering or closing the cutoff plate and fluid may be admitted to the lower end of each cylinder, through a pipe 62, for raising or opening the cutoff plate.

In order to automatically operate these cutoff plates so as to successively extrude the clay columns through the several dies, mechanism such as shown diagrammatically in Fig. 3 may be provided. This mechanism includes valves 63 and 64 respectively for controlling the admission of fluid through the pipes 61 and 62 to the upper and lower ends respectively of each cylinder 59.

Each valve 63 may be operated by a magnet 65 and each valve 64 by a magnet 66. The circuit 67 to each magnet 65 is normally open and arranged to be closed by the switch 68 located in the path of the angle iron 58 on the conveyor from the corresponding die while the magnet 66 is located in a circuit 69 operated by the switch 68 of an adjacent unit.

As shown in Fig. 3, the three units are indicated at A, B and C. The switch 68 of the unit A closes the circuit 67 to the magnet 65 which operates the upper valve 63 of the cylinder 59 of unit A, to lower or close the cutoff plate 22 of said unit. Simultaneously, the closing of this same switch 68 of unit A closes the circuit 69 to the magnet 66 which operates the lower valve 64 of unit C, to raise or open the cutoff plate 22 of said unit. In corresponding manner the switch 68 of unit C closes the circuit 67 to the magnet 65 controlling the upper valve 63 of said unit and simultaneously closes the circuit 69 to the magnet 66 of the lower valve 64 of unit B.

The switch 68 of unit B closes the circuit to the magnet 65 controlling the upper valve 63 of that unit and simultaneously closes the circuit 69 to the magnet 66 controlling the lower valve 64 of unit A.

In the position shown in Fig. 3, the switches 68 of units A and B are both shown in open position while the switch 68 of unit C is shown closed by the angle iron 58 of the corresponding conveyor, thus opening the upper valve 63 of unit C to close the corresponding cutoff plate and simultaneously opening the lower valve 64 of unit B to raise or open the corresponding cutoff plate 62 so as to stop the flow of clay through the die of unit C and start the flow of clay into the die of unit B.

Each gate 37 may be provided near its upper end with a ring or eye 70 to which is connected a cord 71 extending upward over a pulley 72 and having a counterweight 73 upon its other end so that when the gate is unlocked and removed from the end of the die it will be raised above the die so as not to interfere with the clay column being extruded therefrom.

The tuyères are preferably made from a clay body consisting of 50% to 70% flint clay, 10% to 20% high temperature grog, and the balance plastic fire clay.

The clay used in making these tuyères should contain no ferrous sulphide, carbon, sulphur, or iron and must be thoroughly oxidized in burning so that the refractory properties are higher.

The two clays are ground and screened separately, then the ingredients are dry mixed in the above proportions to get a more uniform mixture. This dry mixture is then spouted into a pug mill and water is added to form a plastic mixture which goes from the pug mill to the shredder of the vacuum deairing chamber 11 and is then extruded from the auger barrel 13 through the tuyère dies.

With the gate 37 of the die locked in closed position the clay forced into the die from the auger barrel will fill the die including the enlarged head 28 thereof, the clay being compacted to a greater density by the resulting pressure. As clay may start to leak around the joint of the gate, the latch bar 49 may be raised to the broken line position shown in Fig. 1, releasing the locking bar 45 which may be thrown back to the broken line position shown in Fig. 2, and the gate may be removed from the end of the die and elevated by the counterweight 73.

The operation of the auger machine being continued, with the gate removed from the die it will extrude a round column having the diameter of the reduced portion 24 of the die. This column is indicated in broken lines at 30 in Fig. 7 with the enlarged flared head 29 at its forward end. When this column reaches the desired length the cutoff plate 22 controlling admission of clay to the die will be closed and the cutoff knife 22 may be manually operated in usual and well known manner to cut the column off at the desired length.

This tuyère is supported upon the off-bearing conveyor 56, the cleats 57 thereof supporting the tuyère against lateral and downward deflection as it is extruded from the die. The cut off tuyère may then be rolled off of the conveyor onto the table 74 having a contour which will support the tuyère with the flared head thereon against lateral and downward deflection.

The green tuyère is then dried and burned in such a manner as to get uniform oxidation of the clay body, going first through a water smoking period which removes mechanical moisture and hygroscopic moisture, and then through an oxidizing period which removes the remaining chemical moisture, carbon, sulphur, etc., and then through the burning period, the temperature being raised up to a point where the clay body becomes hard and has maximum shrinkage, burning the tuyère to produce a burned body having a P. C. E. of cone 28 to 32.

The density of the green body due to fewer and smaller voids by reason of deairing creates a body which after drying and burning resists the action of turbulent hot gases and produces a tuyère which lasts longer than those made by other methods. These tuyères are being used in large quantities in a number of steel plants and have been found to have considerably longer life than other tuyères.

When a tuyère burns or cuts, it has to be blanked off putting more work on the other tuyères and causing them to burn out quicker. In one plant the average life of the ordinary tuyère is 26 to 27 heats and in the same plant the average life of this tuyère is 30 to 32 heats. It was found that they hardly ever have to blank off one of these tuyères in less than 20 to 22 heats and in 25 per cent of the time none of these tuyères have to be blanked off during the 32 to 34 heats for which they were being used.

We claim:

1. Means for forming ceramic tuyères comprising an auger extrusion machine having a deairing chamber and an extruding auger barrel, a plurality of cylindric dies communicating with the extrusion barrel, a removable gate upon each die, core rods located through the dies, means upon the gate for positioning and holding the outer ends of the core rods, a cutoff plate for controlling the flow of clay through each die, means for extruding a clay column from each die when the gate is opened, means operated by the movement of the column for closing the cutoff plate to each die when the column extruded therefrom attains a predetermined length and for simultaneously opening the cutoff plate to another of the dies.

2. Means for forming ceramic tuyères comprising an auger extrusion machine having a deairing chamber and an extruding auger barrel, a plurality of cylindric dies communicating with the extrusion barrel, a removable gate upon each die, core rods located through the dies, means upon the gate for positioning and holding the outer ends of the core rods, a cutoff plate for controlling the flow of clay through each die, means for extruding a clay column from each die when the gate is opened, a fluid cylinder for operating each cutoff plate, means operated by the movement of the column for admitting fluid to the corresponding cylinder to close the cutoff plate to each die when the column extruded therefrom attains a predetermined length and for simultaneously admitting fluid to another of the cylinders to open the corresponding cutoff plate.

3. Means for forming ceramic tuyères comprising an auger extrusion machine having a deairing chamber and an extruding auger barrel, a plurality of cylindric dies communicating with the extrusion barrel, a removable gate upon each die, core rods located through the dies, means upon the gate for positioning and holding the outer ends of the core rods, a cutoff plate for controlling the flow of clay through each die, means for extruding a clay column from each die when the gate is opened, means for closing the cutoff plate to each die when the column extruded therefrom attains a predetermined length and for simultaneously opening the cutoff plate to another of the dies.

4. Means for forming ceramic tuyères comprising an auger extrusion machine having a deairing chamber and an extruding auger barrel, a plurality of cylindric dies communicating with the extrusion barrel, a removable gate upon each die, core rods located through the dies, means upon the gate for positioning and holding the outer ends of the core rods, a cutoff plate for controlling the flow of clay through each die, means for extruding a clay column from each die when the gate is opened, a fluid cylinder for operating each cutoff plate, means for admitting fluid to the corresponding cylinder to close the cutoff plate to each die when the column extruded therefrom attains a predetermined length and for simultaneously admitting fluid to another of the cylinders to open the corresponding cutoff plate.

5. Means for forming ceramic tuyères comprising an auger extrusion machine having a deairing chamber and an extruding auger barrel, a plurality of cylindric dies communicating with the extrusion barrel, a removable gate upon each die, core rods located through the dies, means upon the gate for positioning and holding the outer ends of the core rods, a cutoff plate for controlling the flow of clay through each die, means for extruding a clay column from each die when the gate is opened, and means for closing the cutoff plate to each die when the column extruded therefrom attains a predetermined length and for simultaneously opening the cutoff plate of another of the dies.

ROBERT B. KEPLINGER.
CHARLES A. FRY.